United States Patent [19]

Dehm et al.

[11] Patent Number: 4,618,655

[45] Date of Patent: Oct. 21, 1986

[54] PROCESS FOR PREPARATION OF POLYMERS CONTAINING DICARBOXYLIC ACID CYCLIC IMIDE UNITS IN A SOLID/LIQUID SLURRY

[75] Inventors: David C. Dehm, Thornton; H. Franklin Lawson, Downingtown, both of Pa.

[73] Assignee: Atlantic Richfield Company, Los Angeles, Calif.

[21] Appl. No.: 677,656

[22] Filed: Dec. 3, 1984

Related U.S. Application Data

[63] Continuation-in-part of Ser. No. 547,304, Oct. 31, 1983.

[51] Int. Cl.$^4$ .............................. C08F 8/36; C08F 8/32
[52] U.S. Cl. .................................. 525/344; 252/8.51; 525/379
[58] Field of Search ........................................ 525/344

[56] References Cited

U.S. PATENT DOCUMENTS

| | | | |
|---|---|---|---|
| 2,475,886 | 7/1949 | Goebel | 525/327.5 |
| 3,803,087 | 4/1974 | Vaughn | 525/327.5 |
| 4,478,727 | 10/1984 | Turner | 525/327.5 |

Primary Examiner—Christopher Henderson
Attorney, Agent, or Firm—Dennis M. Kozak

[57] ABSTRACT

An improved process for producing polymers containing styrene moieties and cyclic imide moieties by reacting a styrene/maleic anhydride copolymer with a primary amine is improved by conducting the reaction in a heterogeneous slurry of polymer and amine reactants with an aromatic hydrocarbon dispersing agent having a boiling point above 120° C. and simultaneously removing water formed as the reaction proceeds.

5 Claims, No Drawings

PROCESS FOR PREPARATION OF POLYMERS CONTAINING DICARBOXYLIC ACID CYCLIC IMIDE UNITS IN A SOLID/LIQUID SLURRY

This application is a continuation-in-part of application Ser. No. 547,304, filed Oct. 31, 1983.

This invention relates to preparation of polymers useful in drilling fluids.

More specifically, this invention relates to preparation of certain maleimide-containing copolymers and terpolymers useful in water-base drilling fluid compositions used for drilling subterranean wells, typically oil and gas wells.

Drilling fluids are generally classified on the basis of their principal component. When the principal ingredient is a liquid (water or oil) the term "mud" is applied to a suspension of solids in the liquid. Water is the principal component of most drilling fluids and, accordingly, water-base drilling fluids or "water muds" are by far the most common.

Water-base drilling fluids vary widely in composition and properties and many have been classified based on their principal ingredients. Common classifications of water-base drilling fluids are fresh water, salt walter, low solid muds, spud muds, salt water muds, lime muds, gyp muds and CL-CLS muds.

In addition to water, these drilling fluids can comprise any number of known additives which perform various functions in the drilling fluid system. Among the most common additives are materials which increase density such as barite and galena and viscosifiers or thickening agents such as clays (usually bentonite) and asbestos.

Furthermore, many of the water-base drilling fluids are formulated to contain one or more polymeric additives which serve to reduce filtrations, stabilize clays, flocculate drilled solids, increase carrying capacity, emulsify, lubricate and the like. Among the most commonly employed polymeric additives are starches, guar gum, xanthan gum, sodium carboxy-methylcellulose (CMC), hydroxyethylcellulose (HEC), and synthetic water dispersable polymers such as acrylics and alkylene-oxide polymers.

Also well known and important for their ability to reduce flow resistance and gel development in clay-water muds are materials which are broadly referred to in the drilling fluid industry as "thinners".

Materials conventionally used as thinners are classified as plant tannins, polyphosphates, lignitic materials and lignosulfonates.

However, experience has shown that many of the materials which function as conventional thinners also have been found to perform other important functions, frequently of greater significance than improving the flow properties of the mud. Specifically, some have been found effective to reduce filtration and cake thickness, to counteract the effects of salts, to minimize the effect of water on the formations drilled, to emulsify oil in water, and to stabilize mud properties at elevated temperatures. Thus, the term "mud-conditioning agent" is often more appropriate than thinner and as used herein is understood to mean an additive which functions as a conventional thinner and also serves to stabilize mud properties at elevated temperatures.

Additionally, any number of known detergents, lubricants, corrosion inhibitors, materials for control of loss of circulation, surfactants and the like can be incorporated into water-base drilling fluid compositions.

Water-base drilling fluid compositions and additives to impart specific properties thereto are described in detail in Chapters 1, 2, and 11, of *Composition and Properties of Oil Well Drilling Fluids,* Fourth Edition, George R. Gray and H.C.H. Darley, Gulf Publishing Company.

Numerous additives which have been found to be effective to enhance the properties of water-base drilling fluids are taught in the patent literature. The following patents are representative.

U.S. Pat. No. 2,650,905 teaches the use of a sulfonated polystyrene in a water-based drilling fluid decreases the loss of fluid from the mud to the surrounding formation.

U.S. Pat. No. 2,718,497 teaches a drilling fluid containing a linear hydrocarbon chain polymer or copolymer of relatively high molecular weight, in which hydrophilic acid or acid forming groups are present, provides good fluid loss control.

U.S. Pat. No. 3,332,872 teaches that the use of a small amount of a copolymer of styrene and maleic anhydride in a drilling fluid provides effective thinning capability and viscosity control.

U.S. Pat. No. 3,730,900 teaches that a water mud containing a low molecular weight copolymer of styrene and maleic anhydride, exhibits good thermal stability and the ability to handle formation contamination while maintaining an acceptable mud rheology.

U.S. Pat. No. 4,268,400 teaches the reduction of filtrate from a drilling fluid by the utilization of a terpolymer of a monovalent alkali metal salt of acrylic acid, a hydroxy alkyl acrylate and acrylamide.

U.S. Pat. No. 4,284,517 teaches an oil recovery method by waterflooding an oil-containing formation with an aqueous solution of the reaction product of styrene, maleic anhydride and triethylammonium aniline disulfonate.

European Pat. No. 107,316 and Australian Pat. No. 19 052 relate to sodium styrene sulfonate —CO— sodium-N-(4-sulfophenyl)-maleimide as an improve viscosity control additive for water-base drilling muds.

Additional additives and drilling fluid compositions are described in U.S. Pat. Nos. 3,125,517; 3,214,374; 3,236,769; 3,686,119; 3,709,819; 4,064,055; 4,230,586; 4,268,400; and 4,293,427.

U.S. Pat. No. 2,279,410 teaches preparation of a photographic film having a layer of resin formed by reaction of a resin having a maleic anhydride constituent with an amine.

U.S. Pat. No. 3,039,870 teaches preparation of antistatic copolymers of salts of N-sulfoalkyl- $\alpha, \beta$-unsaturated dicarboxylic imides.

U.S. Pat. No. 3,615,531 teaches a photographic material having an antistatic layer of a polymer obtained by sulfonating copolymers of N-phenyl maleic imide prepared by copolymerization of N-phenyl maleic imide or by imidization of a maleic anhydride copolymer.

U.S. Pat. No. 3,840,499 teaches preparation of dicarboxylic acid imide copolymers by reacting ammonia or amines with an aqueous suspension of a copolymer of a non-carboxylic monomer and an ethylenically unsaturated dicarboxylic acid, anhydride or half acid.

U.S. Pat. No. 4,450,261 teaches preparation of low molecular weight copolymers of styrene and maleic anhydride as well as sulfonated copolymers thereof using mercaptopropionic acid or methyl-3-mercaptopropionic acid as chain transfer agent.

The teachings of the above-identified disclosures are incorporated herein by reference thereto.

Thus, there is a long felt need in the drilling fluid industry for a material which displays dispersant (thinning) activity at elevated temperatures in the presence of formation contaminants. We have discovered that water-base drilling fluids containing a sulfonated polymer of recurring units of a maleimide monomer and a vinyl monomer contribute to satisfaction of that need.

The present invention provides an improved process to produce such material or additive which is particularly suitable for use as a mud-conditioning agent for water-base drilling fluids. Water soluble salts of the additive produced by the improved method of this invention, when added to water-base drilling fluids, have been found to be particularly effective in thinning muds at temperatures exceeding 375° F. in the presence of formation contaminants such as formation solids, salts, various forms of calcium and carbon dioxide.

According to this invention, there is provided a method for producing a polymeric additive for a water-base drilling fluid composition which additive is polymer of recurring units of a maleimide monomer, recurring units of a vinyl monomer and, optionally, recurring units of a carboxyl-containing monomer and is produced by reacting a polymer having recurring maleic anhydride with a primary amine in a heterogeneous solid/liquid slurry.

In one embodiment of this invention, the reactants are styrene/maleic anhydride copolymers and aniline and the product is a styrene/N-phenylmaleimide copolymer or a styrene/N-phenylmaleimide/maleic anhydride terpolymer.

In another more preferred embodiment of this invention, the reactants are a sulfonated styrene/maleic anhydride copolymer and aniline and the product is a sulfonated styrene/N-phenylmaleimide copolymer or a sulfonated styrene/N-phenylmaleimide/maleic anhydride terpolymer and the reaction is conducted in a xylene slurry.

The copolymer reactants of this invention are products of copolymerized vinyl monomers and cyclic anhydrides. Suitable vinyl monomers have the formula

wherein $R^1$ is an alkyl group, a cycloaliphatic group, an aromatic group, an alkyl substituted aromatic group, an aryl substituted aromatic group, a condensed aromatic group and an alkyl or aryl substituted condensed aromatic group.

Examples of vinyl monomers which may be used are: styrene, alpha methylstyrene, para methylstyrene, nuclear methylstyrenes, ethylstyrene, isopropylstyrene, tert-butylstyrene, chlorostyrenes, dichlorostyrenes, vinylnaphthalene, indene, methylidenes, styrenes which contain sulfo groups, e.g., p-styrene sulfonic acid, ethylene, propylene, butylene, isoprene, vinyl acetate and its hydrolized from-vinyl alcohol in the polymeric material, vinyl propionate, vinyl butylate, vinyl isobutyl ether and the like, and their mixtures.

Preferred vinyl monomers are the vinyl aromatic monomers. Particularly suitable vinyl aromatic monomers are styrene, alpha methylstyrene, para methylstyrene, nuclear methylstyrenes, ethylstyrene, isopropylstyrene, tert-butylstyrene, vinylnaphthalene and the like and their mixtures.

Suitable cyclic anhydride monomer have the formula

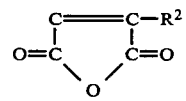

wherein $R^2$ is hydrogen or alkyl having 1 to 10 carbon atoms. Maleic anhydride is the preferred anhydride.

The copolymer or terpolymer reactants can be prepared by a suitable polymerization technique known to those skilled in the art. A particularly suitable polymerization technique for the formation of the copolymer of recurring units of the maleic anhdride monomer and vinyl monomer is conventional free radical polymerization in solution, in bulk or by suspension.

Copolymers of styrene and maleic anhydride have been found particularly suitable in the process of this invention are commercially available. Suitable styrene/maleic anhydride copolymers are available from ARCO Chemical Company, division of Atlantic Richfield Company under the designation SMA ® Resins. Particularly suitable for use are SMA ® 1000, SMA ® 2000, and SMA ® 3000.

SMA ® 1000 has a styrene to maleic anhydride ratio of 1/1 and a number average molecular weight as determined by vapor phase osmometry of 1600.

SMA ® 2000 has a styrene to maleic anhydride ratio of 2/1 and a number average molecular weight as determined by vapor phase osmometry of 1700.

SMA ® 3000 has a styrene to maleic anhydride ratio of 3/1 and a number average molecular weight as determined by vapor phase osmometry of 1900.

The preferred polymer reactants of this invention contain sulfonic acid groups and can be obtained by sulfonation.

Sulfonation of the polymers may be achieved using any conventional sulfonation method and is carried out in any solvent inert to the sulfonating agent whose solvency is high enough to dissolve the polymer. Conventional sulfonating agents include chlorosulfonic acid, liquid sulfur trioxide, sulfuric acid and the like. The sulfonic acid groups on the polymers will typically be present in neutralized form as alkali metal salts, particularly as sodium or potassium salts, and ammonium salts. The amount of or degree of sulfonation of the polymeric additives of this invention is critical only to the extent that the polymers must be sulfonated to a degree effective to make them at least partially soluble in the water-base drilling fluid composition.

Although the polymers may be sulfonated, it may not be necessary under certain conditions to undergo a separate sulfonation step. For example, if a sulfonated monomer such as styrene sulfonic acid monomer is selected, polymerization will result in a sulfonated polymer and thus the need to undergo a separate sulfonation step can be eliminated. Also, a commercially available sulfonated styrene/maleic anhydride copolymer, such as SSMA ®-1000 from ARCO Chemical Company, a division of Atlantic Richfield Company, can be employed after first being acidified. Moreover, the polymers can be imidized in accordance with the process of this invention and sulfonated afterwards.

SSMA ®-1000 has a styrene to maleic anhydride ratio of 1/1 and a number average molecular weight of 1600 as determined by vapor phase osmometry.

Polymers used in the process of this invention prior to sulfonation characteristically have a number average molecular weight as determined by vapor phase osmometry within the range of from about 1,000 to about 50,000. Preferably, the polymers will have a molecular weight of less than 15,000 and, most preferably, less than 5,000.

Moreover, the polymers can be composed of their recurring monomer units within wide mole percent ranges. Preferably, the copolymer will contain in mole percent from about 75 to about 25 recurring units of vinyl monomer and from about 25 to about 75 recurring units of maleic anhydride monomer.

Aside from well drilling fluids, the incorporation of an imide (e.g., succinimide) functionality into styrenic resins has been shown to be desirable in several other applications. The incorporation of the N-phenyl succinimide group has been of considerable interest as a result of the chemical inertness and improvement in thermal properties. Thus, improved methods to introduce an imide function into polymers are sought for both simplicity and economic considerations.

The general imidization of an anhydride-containing polymer with a primary amine is described in U.S. Pat. Nos. 3,615,531, 3,840,499 and 4,317,893, the teachings of which are incorporated herein by reference. The polymers produced using these methods are theoretically completely imidized but sometimes the copolymers may still contain recurring units of acid, anhydride or the half amide due to incomplete imidization. Complete imidization is quite difficult and a typical imidized polymer contains in mole percent from about 25 to about 75 recurring units of vinyl monomer, from about 5 to about 74 recurring units of maleimide and from about 1 to about 70 recurring units of carboxyl-containing monomer resulting from incomplete imidization.

Prior art imidization methods normally utilized an aqueous suspension of the anhydride polymer or a solution in a solvent forming a binary azeotrophe with water. The problems with an aqueous suspension include the detrimental effect of water on the imidization equilibrium and problems with product drying. The solution processes currently known, suffer from low conversion and long reaction times, in addition to the inherent product recovery problems associated with polymer isolation from solutions. The solvent removal problems presented by both methods is particularly troublesome if additional modification of the polymer is required.

In the prior art processes as well as the process of this invention, reacting an anhydride containing polymer with a primary amine results in the cyclic anhydride structure being converted to a cyclic imide. Suitable primary amine reactants are aliphatic or aromatic amines such as methyl, butyl, dodecyl, cyclohexyl, benzyl, phenylethyl or phenylbutyl amines, aniline, alkyl substituted analine with up to 25 alkyl carbon atoms, or polynuclear amines such as naphthylamine. Aniline is most preferred.

It has been surprisingly found that when the polymeric anhydride and the amine are reacted in a heterogeneous system using certain dispersion media, a fast, high imide conversion process can be achieved which further eliminates the need of expensive high pressure equipment and affords a simplified product recovery procedure. Furthermore, the improved process permits an efficient means for removal of water produced during the reaction.

Imidization according to this invention is achieved by reacting the primary amine with the anhydride polymer slurried in an aromatic hydrocarbon dispersion medium. The aromatic hydrocarbon medium does not dissolve the polymer to any significant extent and thus the reaction is conducted in a heterogeneous system. It has been found that in the heterogeneous system temperatures in excess of 120° C. are required to achieve imide conversion rates which are sufficiently high to be commercially viable. The upper limit for the range of reaction temperatures is not critical and for the sake of convenience of operation, the reaction is usually conducted at the reflux temperature of the heterogeneous system. Generally, a temperature of no more than 225° C. is required.

The amine reactant may be used in stoichiometric amounts based on the anhydride moiety in the polymer. However, it is preferred to use an excess of the stoichiometric amount to ensure complete conversion of the anhydride moiety to the desired imide or N-substituted imide. Use of less than stoichiometric amounts of the amine make it possible to prepare polymers containing both the uncyclized dicarboxylic acid corresponding to the anhydride or the anhydride itself and the imide function.

Therefore, a preferred class of aromatic hydrocarbons are those which have a boiling point higher than 120° C. Although hydrocarbons having a boiling point lower than 120° C. can be used if elevated pressures are also used to achieve an appropriate reaction temperature, those hydrocarbons are not preferred.

Examples of suitable hydrocarbons boiling above 120° C. are: xylene, ethyl benzene, diethyl benzene, triethyl benzene, ethyl toluene, propyl toluene, butyl toluene, naphthalene, cumene and the like. Xylene is the most preferred.

A preferred procedure according to this invention is to slurry the polymeric anhydride in the aromatic hydrocarbon dispersing medium and then add the amine reactant. The heterogeneous system can be heated before or after addition of the amine reactant. Furthermore, the polymer is maintained in a dispersed state by vigorous agitation of the system. By use of a reaction temperature corresponding to the reflux temperature of the system, the appropriate temperature level can be maintained and simultaneously the water of reaction can be easily removed by way of distillation into a Dean-Stark trap or similar apparatus.

This process can be completed without the need of any catalyst and provides high conversions of maleic anhydride sites to imide (65% or more). The reaction mixture remains heterogeneous throughout the entire reaction period. The product can be readily recovered by filtration, centrifugation or any of a number of solids recovery processes commonly practiced. The use of a nonsolvent, to allow product recovery via precipitation from solution, is avoided. The aromatic hydrocarbon dispersing medium can provide a water azeotroping function, thereby improving the equilibrium conditions for imidization and resulting in a water-free product. This is particularly important if subsequent polymer modification is required, such as sulfonation for the production of dispersants, associative thickeners and hot melt adhesives.

Having described the materials and methods of this invention, the following non-limiting examples serve to further demonstrate and illustrate the invention.

EXAMPLE 1

A slurry of 80 grams of a styrene/maleic anhydride resin (SMA ®-1000, product of Arco Chemicals) in 670 grams of xylene was warmed to 115° C. under a blanket of dry nitrogen. A solution of 30.7 g. of aniline (about 95% of stoichiometric) in 30 g. of xylene at 115° C. was added to the slurry and the temperature was then increased to 140° C., providing vigorous reflux. The mixture was held at reflux for 4 hours and water was removed from the mixture via distillation into a Dean-Stark trap. Upon cooling to room temperature, the solid product was filtered from the xylene and washed with hexane. The product analysis indicated a nitrogen content of 4.1 wt. % and an acidity of 1.39 meq/g. The composition was determined to be:

|  | mol % | wt % |
| --- | --- | --- |
| Styrene | 52.9 | 29.2 |
| Maleimide | 19.6 | 26.6 |
| Maleic acid | 21.7 | 26.7 |
| Cumene | 5.9 | 5.0 |

EXAMPLE 2

A slurry of 40 grams of styrene/maleic anhydride polymer (SMA ®-1000) in 320 grams of xylene was warmed to 115° C. under a dry nitrogen atmosphere. To the slurry 20.4 grams of neat aniline (25 mole % excess of stoichiometry) was added and the temperature was increased to 140° C. The reaction mixture was held at 140° C. (reflux) for 4 hours while water was removed from the mixture by distillation of the water-xylene azeotrope into a Dean-Stark trap. The mixture was allowed to cool to room temperature and the product was recovered by vacuum filtration. Residual solvent was removed via a hexane wash, air drying (1 hr.) and vacuum drying for 16 hr. (100° C./60 mm). Product recovery was 54.5 grams. Combustion analysis of the product indicated a nitrogen content of 4.6 weight percent. Filtration of the material indicated that free acid sites remained and the concentration of such sites was determined to be 0.96 Meq./g. An examination of the material by infared spectroscopy indicated that amide, carboxylic acid and imide groups were present. Based upon this data, the product composition was determined to be:

|  | mole % | wt. % |
| --- | --- | --- |
| Styrene | 50.0 | 37.7 |
| Maleamic acid | 13.0 | 17.9 |
| Maleimide | 31.4 | 39.5 |
| Cumene | 5.6 | 4.9 |

EXAMPLE 3

About 40 parts by weight of a styrene/maleic anhydride copolymer (SMA ®-1000) were suspended in about 476 parts by weight xylene.

The resulting slurry was heated to about 110° C. and treated with about 20.4 parts by weight of aniline.

The treated slurry was heated to the solvent reflux temperature and held there for about 4 hours under a blanket of dry nitrogen.

Next, the slurry was filtered and the filter cake washed with hexane before being dissolved in tetrahydrofuran (THF).

The resulting copolymer, styrene/N-phenylmaleimide, was recovered from the THF solution by the addition of an excess of hexane. The copolymer was found to have a melting point of 230° C.

Next, a solution of about 30 parts by weight of the recovered copolymer in 60 parts by weight dichloroethane was prepared.

The copolymer containing solution was then added to a solution of about 17.6 parts by weight $SO_c$ in 264 parts by weight dichloroethane at a rate which allowed moderate evolution of heat.

The resulting solution was heated to about 65° C., held at that temperature for about 1 hour and then cooled to about 45° C.

About 170 parts by weight of a 10% weight percent aqueous NaOH solution were added and the mixture reheated to about 65° C. and held for about 1 hour.

The organic and aqueous phases of the mixture were then separated and the aqueous phase was dried and the product was recovered as a sodium salt of a sulfonated styrene/N-phenylmaleimide copolymer additive suitable for use as a drilling mud-conditioning agent. The copolymer contained 10.0 weight percent sulfur based on total weight of the solids.

EXAMPLE 4

About 40 parts by weight of a styrene/maleic anhydride copolymer (SMA ® 2000) were suspended in about 476 parts by weight xylene.

The resulting slurry was heated to about 110° C. and treated with about 11.6 parts by weight of aniline.

The treated slurry was heated to the solvent reflux temperature and held there for about 4 hours under a blanket of dry nitrogen.

Next, the slurry was filtered and the filter cake was washed with hexane before being dissolved in THF.

The resulting copolymer, styrene/N-phenylmaleimide, was recovered from the THF solution by the addition of an excess of hexane.

Next, a solution of about 20 parts by weight of the recovered copolymer in 60 parts by weight dichloroethane was prepared.

The copolymer containing solution was then added to a solution of about 12.4 parts by weight $SO_3$ in 264 parts by weight dichloroethane at a rate which allowed moderate evolution of heat.

The resulting solution was heated to about 65° C., held at that temperature for about 1 hour and then cooled to about 45° C.

About 100 parts by weight of a 10% weight percent aqueous NaOH solution were added and the mixture reheated to about 65° C. and held for about 1 hour.

The organic and aqueous phases of the mixture were then separated and the aqueous phase was dried and the product was recovered as a sodium salt of a sulfonated styrene/N-phenylmaleimide copolymer suitable for use as a drilling mud-conditioning agent of this invention. The copolymer containing 11.0 weight percent sulfur based on total weight of the solids.

EXAMPLE 5

About 40 parts by weight of a styrene/maleic anhydride copolymer (SMA® 3000) were suspended in about 476 parts by weight xylene.

The resulting slurry was heated to about 110° C. and treated with about 9.1 parts by weight of aniline.

The treated slurry was heated to the solvent reflux temperature and held there for about 4 hours under a blanket of dry nitrogen.

Next, the slurry was filtered and the filter cake washed with hexane before being dissolved in THF.

The resulting copolymer styrene/N-phenylmaleimide, was recovered from the THF solution by the addition of an excess of hexane.

Next, a solution of about 20 parts by weight of the recovered copolymer in 60 parts by weight dichloroethane was prepared.

The copolymer containing solution was then added to a solution of about 12.9 parts by weight $SO_3$ in 264 parts by weight dichloroethane at a rate which allowed moderate evolution of heat.

The resulting solution was heated to about 65° C., held at that temperature for about 1 hour and then cooled to about 45° C.

Next, about 100 parts by weight of a 10 weight percent aqueous NaOH solution were added and the mixture reheated to about 65° C. and held for about 1 hour.

The organic and aqueous phases of the mixture were then separated and the aqueous phase was dried and the product was recovered as a sodium salt of a sulfonated styrene/N-phenylmaleimide copolymer additive suitable for use as a drilling mud-conditioning agent. The copolymer contained 12.0 weight percent sulfur based on total weight of the solids.

What is claimed is:

1. In the process for producing a sulfonated polymer containing styrene moieties and cyclic imide moieties by reacting a copolymer containing styrene moieties and cyclic carboxylic anhydride moieties with a primary amine followed by sulfonation, the improvement comprises conducting the imidization of the anhydride moieties by reacting the primary amine with the copolymer slurried in an aromatic hydrocarbon having a boiling point greater than 120° C. and simultaneously removing water formed as the reaction proceeds, wherein the aromatic hydrocarbon does not dissolve the copolymer and the imidization reaction is conducted in a heterogenous slurry of the primary amine, the undissolved copolymer and the aromatic hydrocarbon.

2. The process according to claim 1 wherein the aromatic hydrocarbon dispersing agent is xylene.

3. The process according to claim 1 wherein the copolymer is a styrene/maleic anhydride copolymer.

4. The process according to claim 1 wherein the amine is aniline.

5. The process according to claim 1 wherein the copolymer and the amine are reacted at the reflux temperature of the heterogeneous slurry.

* * * * *